US007942372B2

(12) United States Patent
Koh

(10) Patent No.: US 7,942,372 B2
(45) Date of Patent: May 17, 2011

(54) MULTI-FUNCTIONAL RACK FOR A WHITEBOARD

(76) Inventor: Tuang-Hock Koh, Taichung (TW)

( * ) Notice: Subject to any disclaimer, the term of this patent is extended or adjusted under 35 U.S.C. 154(b) by 302 days.

(21) Appl. No.: 12/337,631

(22) Filed: Dec. 18, 2008

(65) Prior Publication Data

US 2010/0155563 A1 Jun. 24, 2010

(51) Int. Cl.
*F16M 11/00* (2006.01)
*A47B 97/04* (2006.01)

(52) U.S. Cl. .................... 248/125.8; 248/124.1; 248/449

(58) Field of Classification Search ............... 248/122.1, 248/124.1, 125.1, 182, 449, 451, 460, 461; 108/20, 136, 144.1, 146, 147; 312/195, 196, 312/223.1, 223.2, 223.6, 351; 211/175, 207, 211/208, 209
See application file for complete search history.

(56) References Cited

U.S. PATENT DOCUMENTS

| | | | | | |
|---|---|---|---|---|---|
| 4,856,749 | A | * | 8/1989 | Habermann | 248/448 |
| 5,129,661 | A | * | 7/1992 | Ono et al. | 277/479 |
| 5,408,940 | A | * | 4/1995 | Winchell | 108/147 |
| 5,494,251 | A | * | 2/1996 | Katz | 248/449 |
| 5,630,566 | A | * | 5/1997 | Case | 248/122.1 |
| 5,752,448 | A | * | 5/1998 | Eyre | 108/20 |
| 6,546,880 | B2 | * | 4/2003 | Agee | 108/147 |
| 7,128,003 | B2 | * | 10/2006 | Okninski | 108/147 |
| 7,195,213 | B2 | * | 3/2007 | Weatherly | 248/125.1 |
| 2010/0155563 | A1 | * | 6/2010 | Koh | 248/449 |

* cited by examiner

*Primary Examiner* — Amy J Sterling
*Assistant Examiner* — Tan Le

(57) ABSTRACT

A multi-functional rack for a whiteboard includes a lower adjuster. The lower adjuster has two lower telescopic tubes respectively disposed two lateral sides thereof. The lower adjuster has a driving mechanism mounted thereon. A frame is fixed on lower adjuster. The driving mechanism is connected to the frame for lifting the frame. An upper adjuster is mounted on a top of the lower adjuster. The upper adjuster has two upper telescopic tubes respectively disposed on two lateral sides thereof. An upper cross beam has two ends simultaneously fixed on an upper part of the both two lower telescopic tubes. An upper sleeve is rotatably mounted on the cross beam. A telescopic arm is connected to the upper sleeve. An adjusting mechanism is mounted on the upper adjuster.

6 Claims, 7 Drawing Sheets

MULTI-FUNCTIONAL RACK FOR A WHITEBOARD

BACKGROUND OF THE INVENTION

1. Field of the Invention

The present invention relates to a rack, and more particularly to a multi-functional rack for a whiteboard.

2. Description of Related Art

A conventional rack for a whiteboard includes a front rod assembly and a rear rod assembly connected to the front rod assembly. Each of the two rod assemblies has a first tube, a second tube telescopically received in the first tube, and a third tube telescopically received in the second tube. A first lock mechanism is disposed between the first tube and the second tube. When adjusting a height of the whiteboard, the second tube is longitudinally movable relative to the first tube, and the third tube is longitudinally movable relative to the second tube. A second lock mechanism is disposed between the second tube and the third tube. Each lock mechanism is provided for pressing a space between the tubes to fix a height of the conventional rack.

The conventional rack is provided for arranging whiteboard positioned thereon. However, the whiteboard is usually operated with a computer and a projector. The conventional rack could not easily combine with the computer, the projector, and the whiteboard for cooperating together. Furthermore, the lock mechanism is simply fixed the tubes for maintain the height of the conventional rack. When bearing a heavy whiteboard, the lock mechanism may not support a weight of the heavy whiteboard such that the tubes are slid relative to each other and not to provide a supporting effect.

The present invention has arisen to mitigate and/or obviate the disadvantages of the conventional rack for the whiteboard.

SUMMARY OF THE INVENTION

To achieve the objective, the multi-functional rack for a whiteboard in accordance with the present invention comprises a lower adjuster. The lower adjuster has two lower telescopic tubes respectively disposed on two lateral sides thereof. The lower adjuster has a driving mechanism mounted thereon for providing a lifting effect. The driving mechanism telescopically connected to a lower cross beam. The lower cross beam has two ends simultaneously fixed on the both lower telescopic tubes. A frame is fixed on the lower cross beam for adapting to support a whiteboard and being lifted by the driving mechanism. The driving mechanism has an adjusting wheel rotatably positioned on the upper cross beam. The driving mechanism has an inner sleeve longitudinally extending form the adjusting wheel and synchronously rotated with the adjusting wheel. The driving mechanism has an outer sleeve sleeved on the inner sleeve and connected to the cross beam. The driving mechanism has a worm gear unrotatably received in the outer sleeve and engaged to the inner sleeve. The driving mechanism has a spindle extending from the worm gear and extending through the cross beam, the upper sleeve unrotatably sleeved on the spindle. An upper adjuster is mounted on a top of the lower adjuster. The upper adjuster has two upper telescopic tubes respectively disposed on two lateral sides thereof. An upper cross beam has two ends simultaneously fixed on an upper part of the both two lower telescopic tubes. A cross beam has two ends simultaneously fixed on both two upper telescopic tubes. An upper sleeve is rotatably mounted on the cross beam. A telescopic arm is connected to the upper sleeve for adapting to connecting a projector. An adjusting mechanism is mounted on the upper adjuster and positioned between the upper cross beam and the cross beam for lifting the cross beam relative to the upper cross beam.

The frame is lifted by the driving mechanism for adjusting a height of the whiteboard supported by the frame. A height of the telescopic arm is adjustable due to the cross beam and the outer sleeve are lifted by the adjusting mechanism relative to the upper cross beam. A length of the telescopic arm is adjustable for adapting to adjust a distance between the projector and the whiteboard. The telescopic arm is pivotable due to the upper sleeve is synchronously rotated with the telescopic arm such that an angle of the projector is adjustable. Furthermore, when the adjusting wheel is rotated and the inner sleeve is synchronously rotated with the adjusting wheel, the inner sleeve is rotatably engaged to the worm gear relatively driving the worm gear. The worm gear is longitudinally moved relative to the inner sleeve for adjusting the height of the projector fixed on the telescopic arm connected to the upper sleeve.

Further benefits and advantages of the present invention will become apparent after a careful reading of the detailed description with appropriate reference to the accompanying drawings.

DETAILED DESCRIPTION OF THE INVENTION

Figure 1:
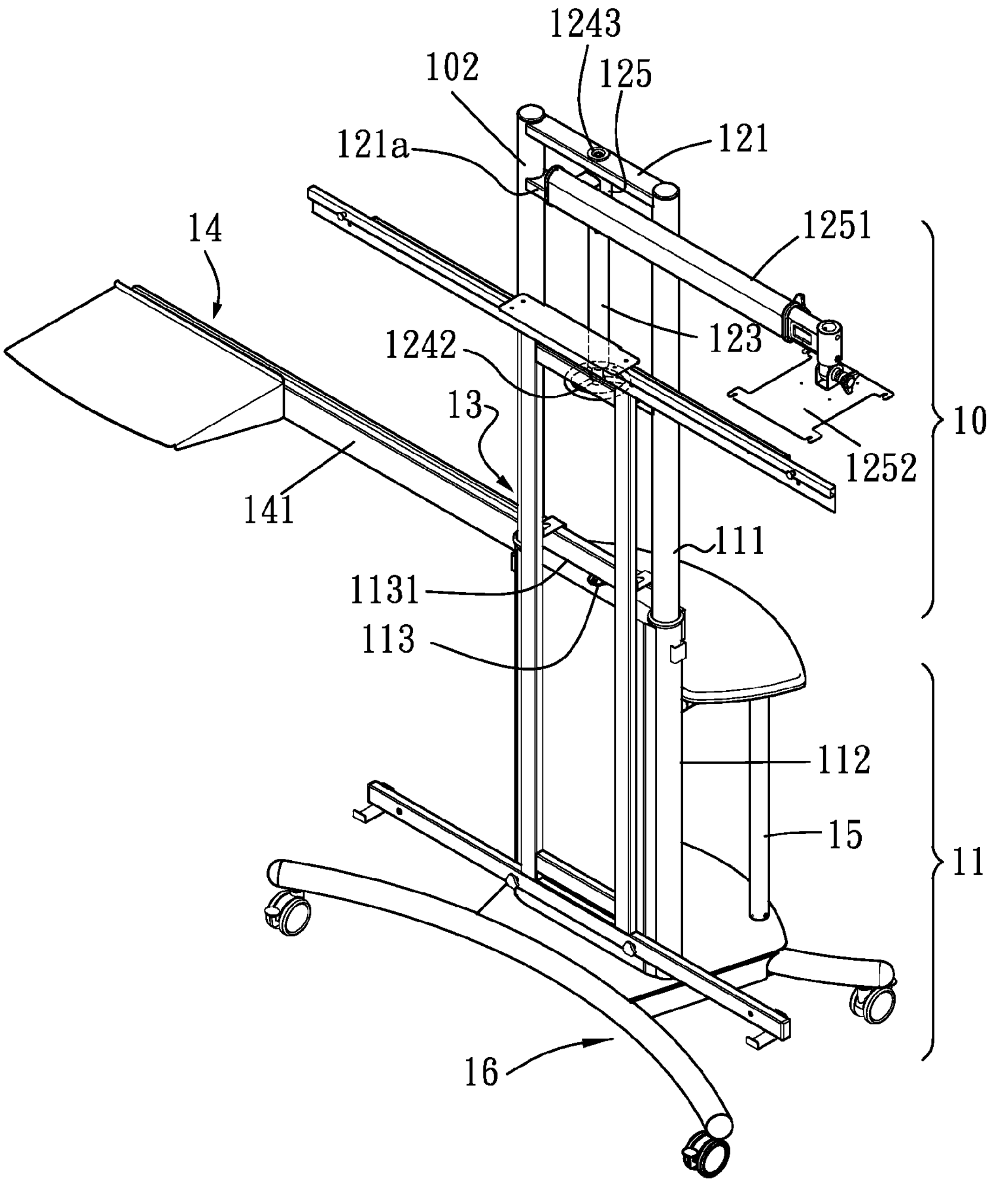
FIG. 1 is a perspective view of a multi-functional rack for a whiteboard in accordance with the present invention.
Figure 2:
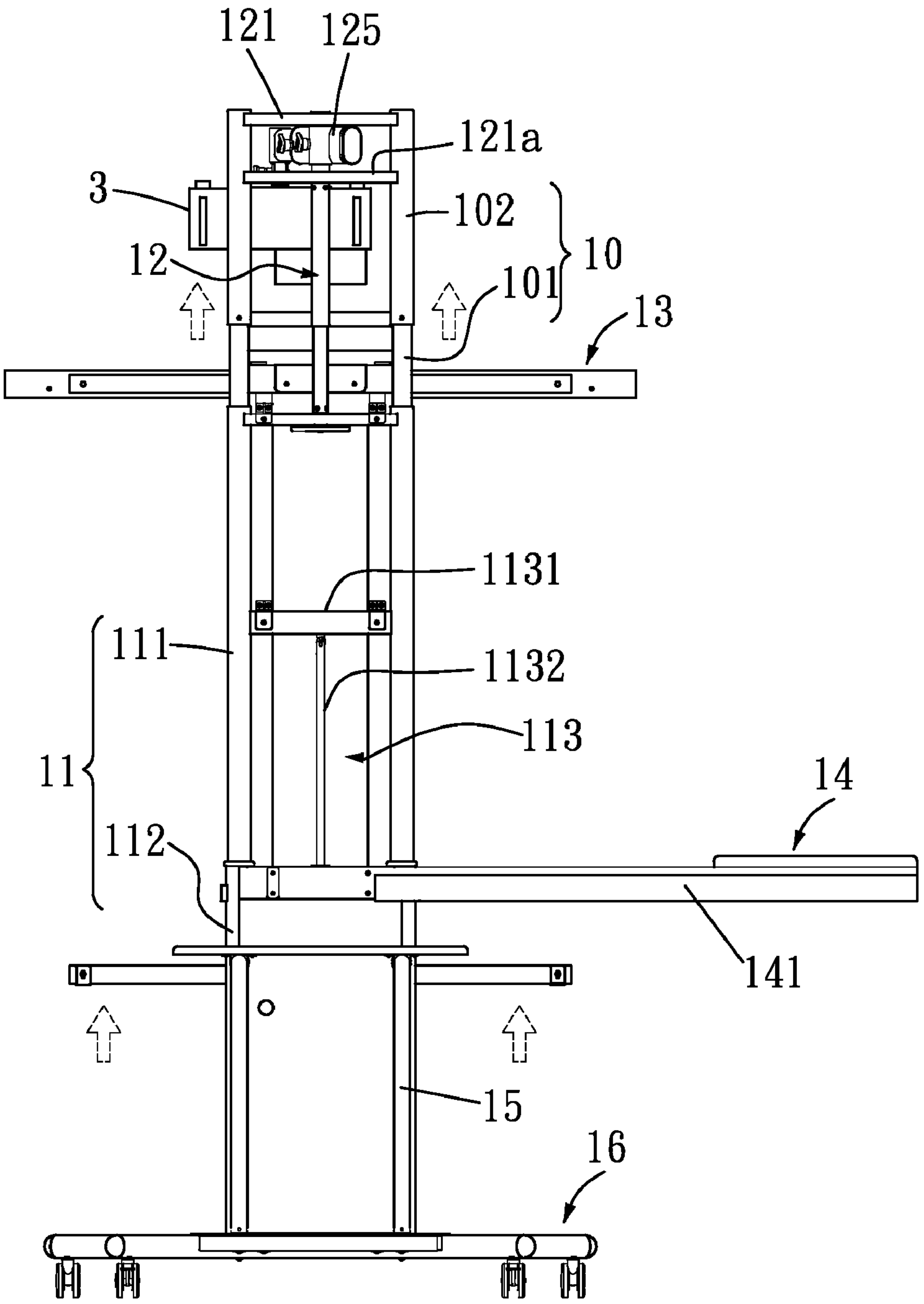
FIG. 2 is a rear plan view of the multi-functional rack for a whiteboard in accordance with the present invention.
Figure 7:
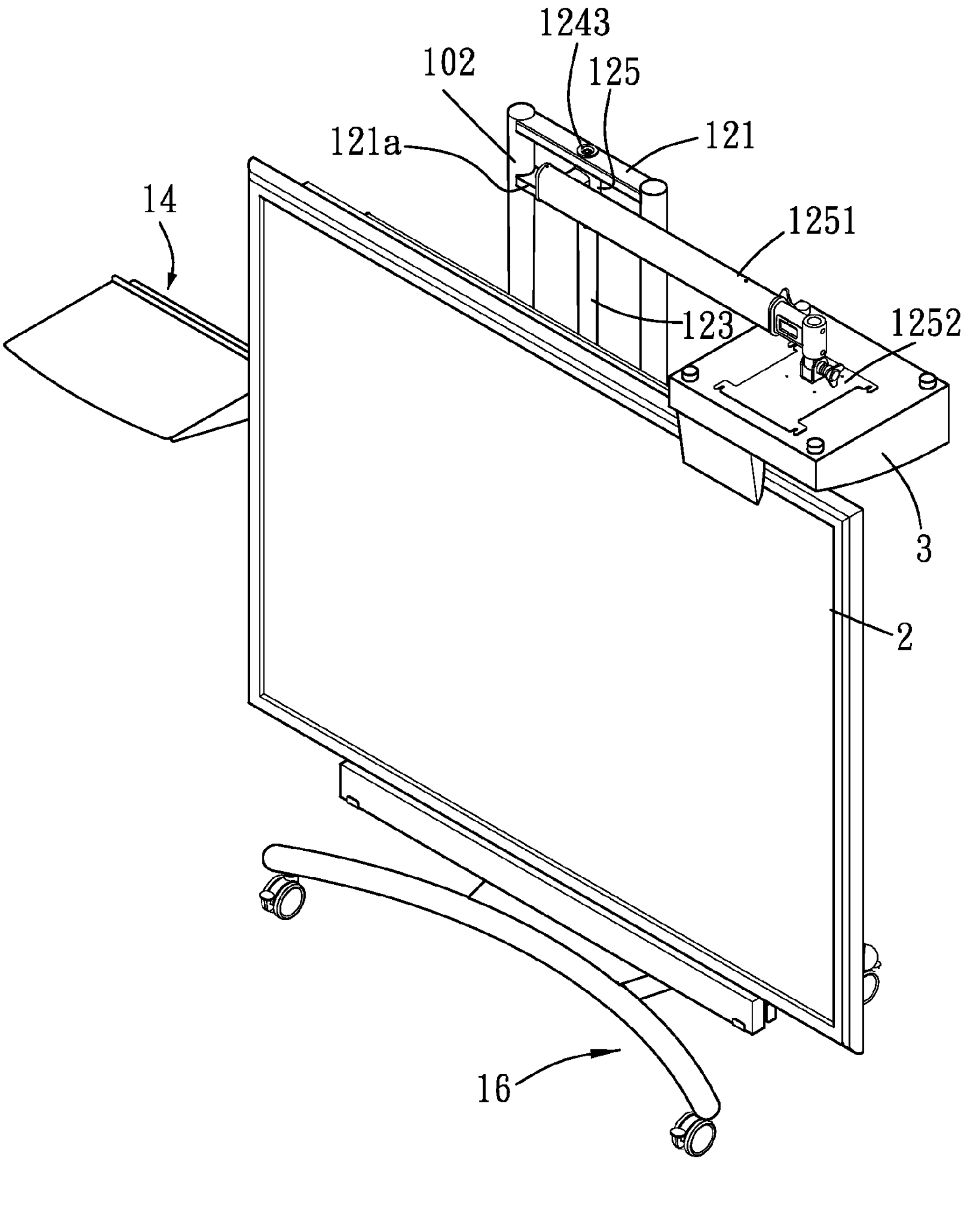
FIGS. 7-9 are operational perspective views of a telescopic arm of the multi-functional rack for a whiteboard in accordance with the present invention.

Referring to the drawings and initially to FIGS. 1-2, a multi-functional rack for a whiteboard in accordance with the present invention comprises a lower adjuster (11), an upper adjuster (10) mounted on the lower adjuster (11), and a frame (13) movably mounted on a lower adjuster (11) for adapting to stably support a whiteboard (2, shown on FIG. 7).

The lower adjuster (11) includes two lower telescopic tubes respectively disposed on two lateral sides thereof. In the preferred embodiment of the present invention, each lower telescopic tube has an outer tube (112) and an inner tube (111) received in the outer tube (112). The lower adjuster (11) has a driving mechanism (113) mounted on a rear side thereof and positioned on a lower part thereof for providing a lifting effect. In preferred embodiment of the present invention, the driving mechanism (113) can be an electric linear actuator device, an air pressure actuator device, or a hydraulic pressure actuator device to provide a power for lifting. A lower cross beam (1131) has two ends simultaneously fixed on the both two lower telescopic tubes. The driving mechanism (113) has a push rod (1132) telescopically extending therefrom and connected to the lower cross beam (1131). The push rod (1132) is driven by the driving mechanism (113) for longitudinally moving to lift the frame (13). A table (15) is fixed on the lower adjuster (11) and is adjacent to driving mechanism (113). The frame (13) is fixed on the lower cross beam (1131)

from the front side of the lower adjuster (11). A wheel assembly (16) is mounted on a bottom of the lower adjuster (11) for easily moving the multi-functional rack in accordance with the present invention. A lower arm (141) is fixed on a lower part of the both two lower telescopic tubes of the lower adjuster (11) and laterally extends from the lower adjuster (11). The lower arm (141) has a loader (14) disposed on a distal end thereof for adapting to support a laptop.

The upper adjuster (10) is mounted on a top of the lower adjuster (11). The upper adjuster (10) includes two upper telescopic tubes respectively disposed on two lateral sides thereof. In the preferred embodiment of the present invention, each upper telescopic tube has an inner tube (101) and an outer tube (102) sleeved on the inner tube (101). Each inner tube (101) of the upper adjuster (10) is mounted on a corresponding inner tube (111) of the lower adjuster (11). An upper cross beam (121*b*) has two ends simultaneously fixed on an upper part of the both two lower telescopic tubes. A top cross beam (121) has two ends simultaneously fixed on a top of the both two upper telescopic tubes. A cross beam (121*a*) has two ends simultaneously fixed on the both two upper telescopic between the top cross beam (121) and the upper cross beam (121*b*). An adjusting mechanism (12) is mounted on a rear side of the upper adjuster (10) and substantially positioned between the cross beam (121*a*) and the top cross beam (121). The adjusting mechanism (12) has an adjusting wheel (1242) rotatably positioned on the upper cross beam (121*b*). An inner sleeve (122) longitudinally extends from the adjusting wheel (1242) and is synchronously rotated with the adjusting wheel (1242). An outer sleeve (123) is sleeved on the inner sleeve (122) and connected to the cross beam (121*a*). A worm gear (1241) is unrotatably received in the outer sleeve (123) and engaged to the inner sleeve (122). A spindle (1243) upwardly extends from the worm gear (1241) and extends through the cross beam (121*a*) for unrotatably connecting to the top cross beam (121). An upper sleeve (125) is rotatably sleeved on the spindle (1243) and position between the top cross beam (121) and the cross beam (121*a*). A telescopic arm (1251) is connected to the upper sleeve (125) from a front side of the upper adjuster (10). The telescopic arm (1251) is pivotable (15) due to the upper sleeve (125) is synchronously rotated with the telescopic arm (1251). The telescopic arm (1251) has a loader (1252) disposed on a distal end thereof for adapting to connect a projector (3).

Figure 3:
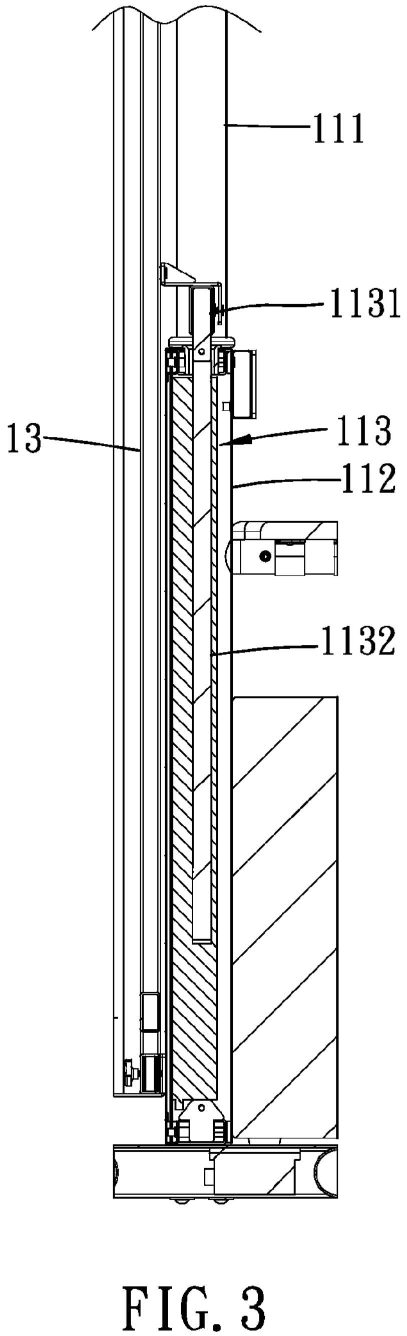
FIGS. 3-4 are operational perspective views of a lower adjuster of the multi-functional rack for a whiteboard in accordance with the present invention.
Figure 4:
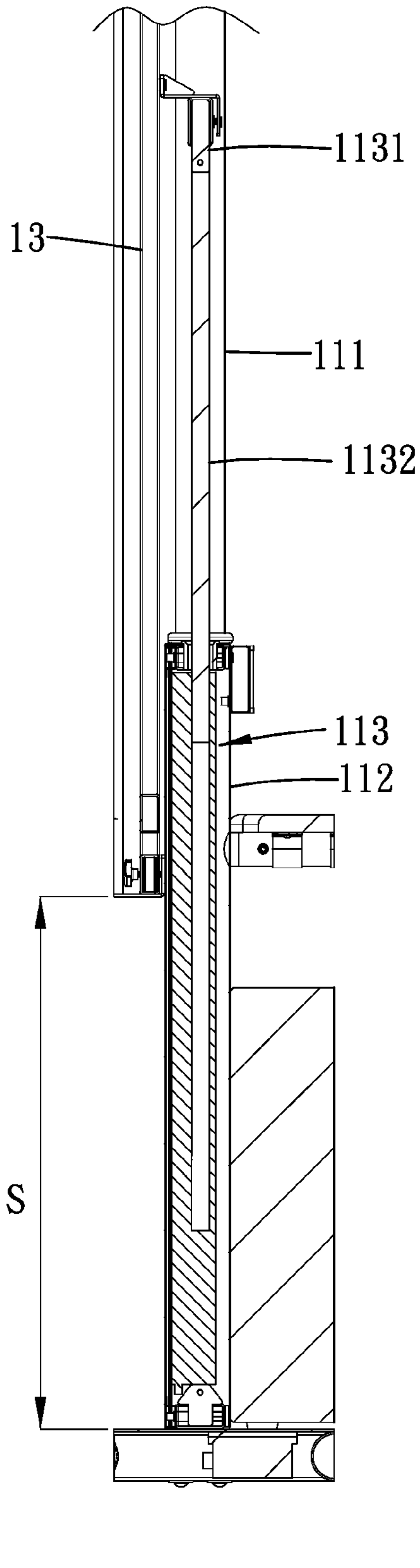

With reference to FIGS. 3-4, when the driving mechanism (113) drives the push rod (1132) longitudinally moving relative to the driving mechanism (113) for pushing the lower cross beam (1131), the lower cross beam (1131) and the frame (13) fixed on the lower adjuster (11) are synchronously upwardly pushed by the push rod (1132) for adjusting a height of the whiteboard (2) supported by the frame (13).

Figure 5:
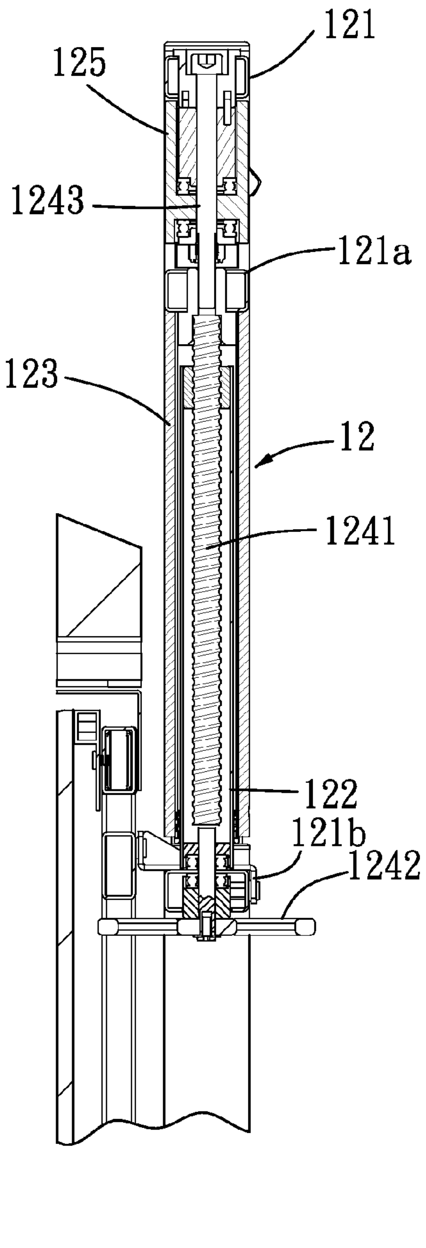
FIGS. 5-6 are operational perspective views of an upper adjuster of the multi-functional rack for a whiteboard in accordance with the present invention.
Figure 6:
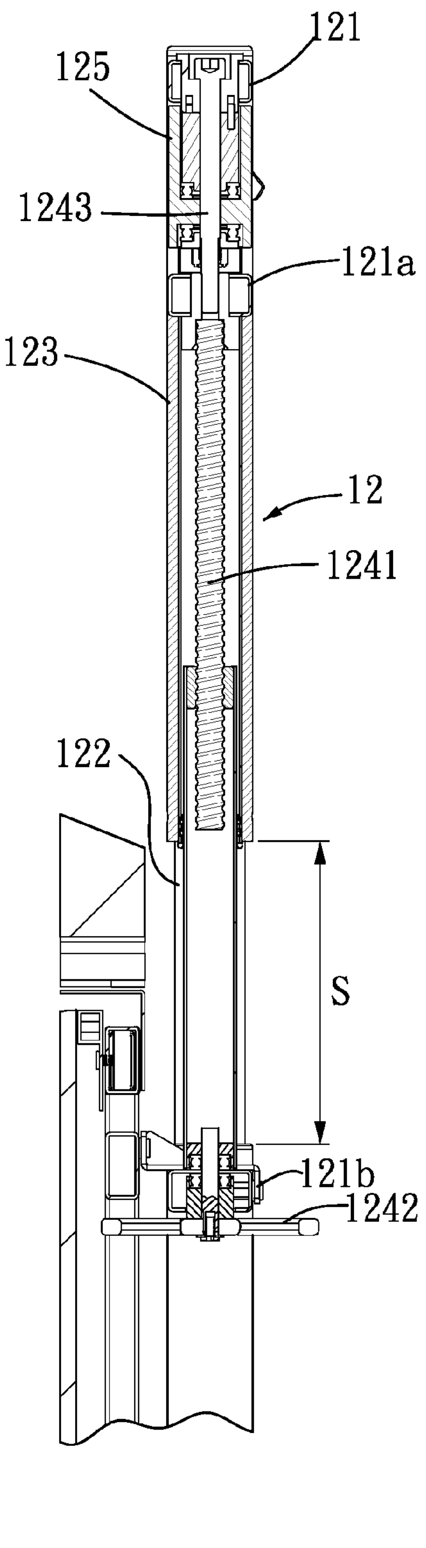

With reference to FIGS. 5-6, when the adjusting wheel (1242) is rotated, the inner sleeve (122) is synchronously rotated with adjusting wheel (1242) such that the inner sleeve (122) rotatably engages to the worm gear (1241) for relatively driving the worm gear (1241). The worm gear (1241) is longitudinally moved relative to the inner sleeve (122). The outer sleeve (123) and the spindle (1243) are synchronously moved with the worm gear (1241) such that a height of the projector (3) fixed on the telescopic arm (1251) is adjustable (15).

Figure 8:
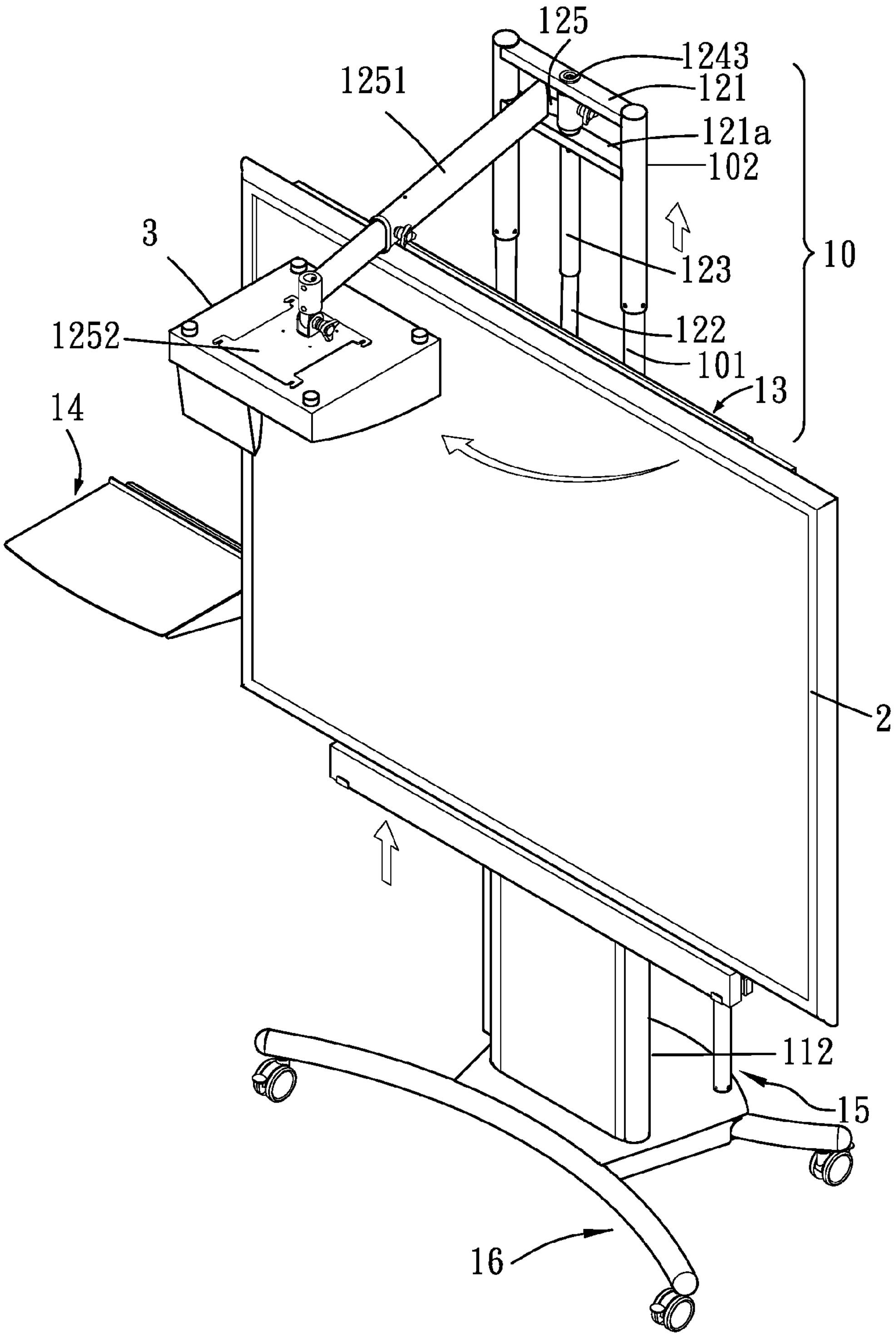
Figure 9:
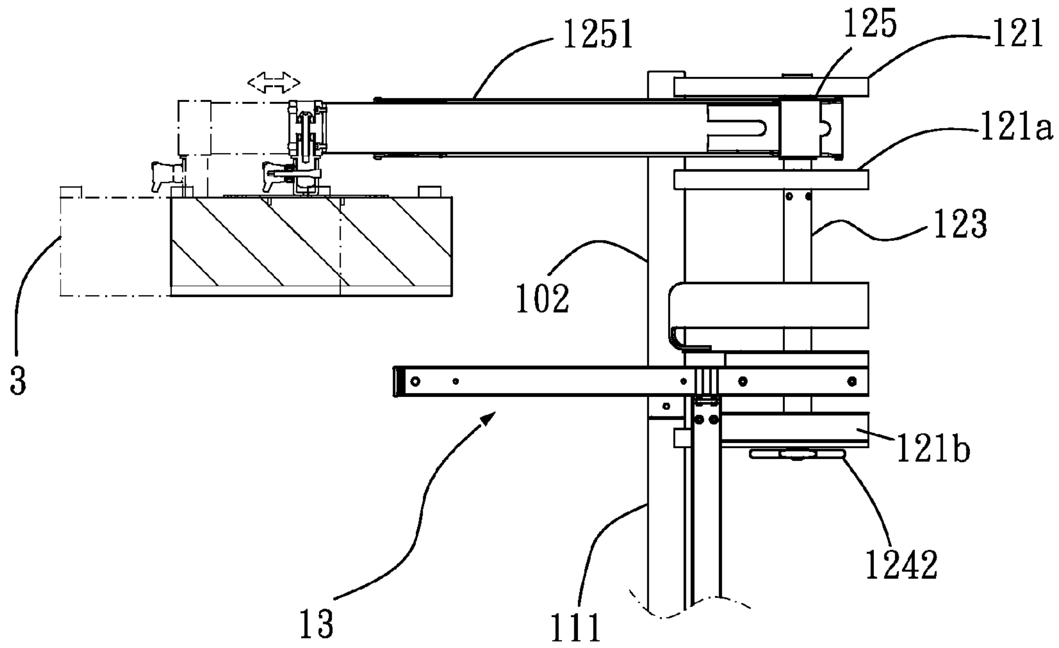

With reference to FIGS. 7-9, a length of the telescopic arm (1251) is adjustable (15) for adjusting a distance between the projector (3) and the whiteboard (2). The telescopic arm (1251) is pivoted as an axis of the upper sleeve (125) for adjusting an angle of the projector (3) fixed on the telescopic arm (1251). The height of the projector (3) fixed on the telescopic arm (1251) is adjustable (15) due to the adjusting wheel (1242) is rotated to engage the worm gear (1241) for longitudinally moving the outer sleeve (123) and the spindle (1243). A height of the frame (13) supporting the whiteboard (2) is adjustable (15) due to the driving mechanism (113) drives the push rod (1132) longitudinally moving for pushing the lower cross beam (1131) and the frame (13).

Although the invention has been explained in relation to its preferred embodiment, it is to be understood that many other possible modifications and variations can be made without departing from the spirit and scope of the invention as hereinafter claimed.

What is claimed is:

1. A multi-functional rack for a whiteboard comprising:

a lower adjuster having two lower telescopic tubes respectively disposed on two lateral sides thereof, the lower adjuster having a driving mechanism mounted thereon for providing a lifting effect, the driving mechanism telescopically connected with a lower cross beam, the lower cross beam having two ends simultaneously fixed on the both lower telescopic tubes, a frame fixed on the lower cross beam for adapting to support a whiteboard and being lifted by the driving mechanism;

an upper adjuster mounted on a top of the lower adjuster, the upper adjuster having two upper telescopic tubes respectively disposed on two lateral sides thereof, an upper cross beam having two ends simultaneously fixed on an upper part of the both two lower telescopic tubes, a cross beam having two ends simultaneously fixed on both two upper telescopic tubes, an upper sleeve rotatably mounted on the cross beam, a telescopic arm connected to the upper sleeve for adapting to connecting a projector, an adjusting mechanism mounted on the upper adjuster and positioned between the upper cross beam and the cross beam for lifting the cross beam relative to the upper cross beam, the adjusting mechanism including:

an adjusting wheel rotatably positioned on the upper cross beam;

an inner sleeve longitudinally extending form the adjusting wheel and synchronously rotated with the adjusting wheel;

an outer sleeve sleeved on the inner sleeve and connected to the cross beam;

a worm gear unrotatably received in the outer sleeve and engaged to the inner sleeve; and a spindle extending from the worm gear and extending through the cross beam, the upper sleeve unrotatably sleeved on the spindle;

wherein when the adjusting wheel is rotated and the inner sleeve is synchronously rotated with the adjusting wheel, the inner sleeve rotatably engaging to the worm gear for relatively driving the worm gear, the worm gear longitudinally moved relative to the inner sleeve for adjusting the height of the projector fixed on the telescopic arm connected to the upper sleeve;

wherein the frame is lifted by the driving mechanism for adjusting a height of the whiteboard supported by the frame; a height of the telescopic arm is adjustable due to the cross beam and the outer sleeve are lifted by the adjusting mechanism relative to the upper cross beam; a length of the telescopic arm is adjustable for adapting to adjust a distance between the projector and the whiteboard; the telescopic arm is pivotable due to the upper sleeve is synchronously rotated with the telescopic arm such that an angle of the projector is adjustable.

2. The multi-functional rack for a whiteboard as claimed in claim 1, wherein the driving mechanism is an electric linear actuator device.

3. The multi-functional rack for a whiteboard as claimed in claim 1, wherein the driving mechanism is a hydraulic pressure actuator device.

4. The multi-functional rack for a whiteboard as claimed in claim 1, wherein the driving mechanism is an air pressure actuator device.

5. The multi-functional rack for a whiteboard as claimed in claim 1 further comprising a wheel assembly mounted on a bottom of the lower adjuster for easily moving the multi-functional rack.

6. The multi-functional rack for a whiteboard as claimed in claim 1 further comprising a lower arm fixed on a lower part of the both two lower telescopic tubes of the lower adjuster and laterally extending from the lower adjuster, the lower arm having a loader disposed on a distal end thereof for adapting to support a laptop.

* * * * *